US009407860B2

(12) United States Patent
Barnes, Jr.

(10) Patent No.: US 9,407,860 B2
(45) Date of Patent: Aug. 2, 2016

(54) SYSTEM, METHOD AND COMPUTER PROGRAM PRODUCT FOR PROCESSING IMAGE DATA

(71) Applicant: Melvin Lee Barnes, Jr., Henderson, NV (US)

(72) Inventor: Melvin Lee Barnes, Jr., Henderson, NV (US)

(*) Notice: Subject to any disclaimer, the term of this patent is extended or adjusted under 35 U.S.C. 154(b) by 0 days.

(21) Appl. No.: 13/858,799

(22) Filed: Apr. 8, 2013

(65) Prior Publication Data
US 2013/0265450 A1 Oct. 10, 2013

Related U.S. Application Data

(60) Provisional application No. 61/621,272, filed on Apr. 6, 2012.

(51) Int. Cl.
H04N 5/225 (2006.01)
H04N 5/77 (2006.01)
H04N 5/232 (2006.01)
G06F 17/30 (2006.01)
H04N 21/258 (2011.01)
H04N 21/4223 (2011.01)
H04N 21/45 (2011.01)
H04N 21/454 (2011.01)
H04N 21/81 (2011.01)

(52) U.S. Cl.
CPC ............ *H04N 5/77* (2013.01); *G06F 17/30247* (2013.01); *G06F 17/30268* (2013.01); *G06F 17/30997* (2013.01); *H04N 5/23219* (2013.01); *H04N 5/772* (2013.01); *H04N 21/25866* (2013.01); *H04N 21/4223* (2013.01); *H04N 21/454* (2013.01); *H04N 21/4524* (2013.01); *H04N 21/812* (2013.01)

(58) Field of Classification Search
CPC .................. H04N 5/232; H04N 5/23202
USPC ............................... 348/207.1, 207.11
See application file for complete search history.

(56) References Cited

U.S. PATENT DOCUMENTS

| 7,813,526 | B1* | 10/2010 | Bourdev | 382/103 |
|---|---|---|---|---|
| 2004/0027624 | A1* | 2/2004 | Parulski et al. | 358/527 |
| 2005/0018057 | A1* | 1/2005 | Bronstein et al. | 348/239 |
| 2005/0130678 | A1* | 6/2005 | Jendbro et al. | 455/456.6 |
| 2008/0068486 | A1* | 3/2008 | Kusaka | 348/333.02 |
| 2008/0165081 | A1* | 7/2008 | Lawther et al. | 345/1.2 |
| 2009/0192967 | A1* | 7/2009 | Luo et al. | 706/47 |
| 2009/0324022 | A1* | 12/2009 | Sangberg et al. | 382/118 |
| 2010/0191466 | A1* | 7/2010 | DeLuca et al. | 701/213 |
| 2010/0211575 | A1* | 8/2010 | Collins et al. | 707/749 |
| 2010/0259641 | A1* | 10/2010 | Fujimoto | 348/231.3 |
| 2010/0277611 | A1* | 11/2010 | Holt et al. | 348/231.2 |
| 2012/0098989 | A1* | 4/2012 | Sugawara | 348/222.1 |

* cited by examiner

Primary Examiner — Roberto Velez
Assistant Examiner — Stephen Coleman

(57) ABSTRACT

A method for processing a first image having associated location data is provided. In one embodiment, the method comprises determining that a location alias exists for the location data of the first image, storing the location alias in memory in association with the first image, determining an identity of a person who appears in the first image via processing of facial data of the person from the first image, storing information of the identity of the person appearing in the first image in memory in association with the first image, outputting the first image to a display in response to a request, outputting the location alias to the display for viewing concurrently with the first image, and outputting the identity of the person who appears in the first image to the display for viewing concurrently with the first image.

19 Claims, 7 Drawing Sheets

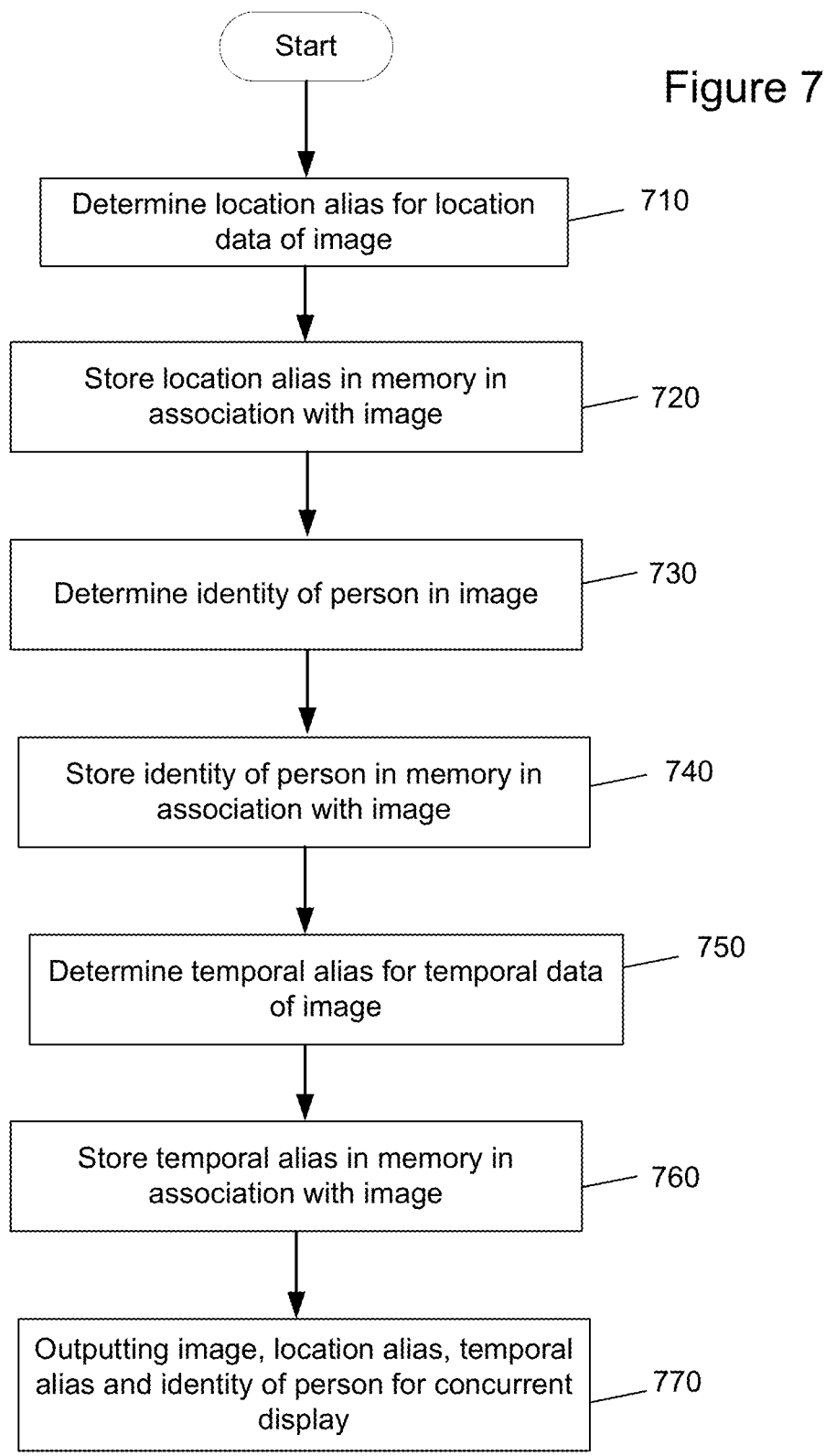

SYSTEM, METHOD AND COMPUTER PROGRAM PRODUCT FOR PROCESSING IMAGE DATA

CROSS REFERENCE TO RELATED APPLICATIONS

This application claims priority to U.S. Provisional Application No. 61/621,272 filed Apr. 6, 2012, which is hereby incorporated herein by reference in its entirety for all purposes.

BACKGROUND OF THE INVENTION

The present invention generally relates to providing processing image data and more particularly, to a system, method and computer program product for processing images and image related data and for performing actions based on the results of the processing.

There is a need to process images and image related data to harvest meaningful information therefrom and to use that information in a productive manner. Some embodiments of the present invention provide means for satisfying one or more of these needs and/or providing other solutions.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown.

FIG. 7 is a flow chart according to an example embodiment of the present invention.

DETAILED DESCRIPTION OF ILLUSTRATIVE EMBODIMENTS

Figure 1:
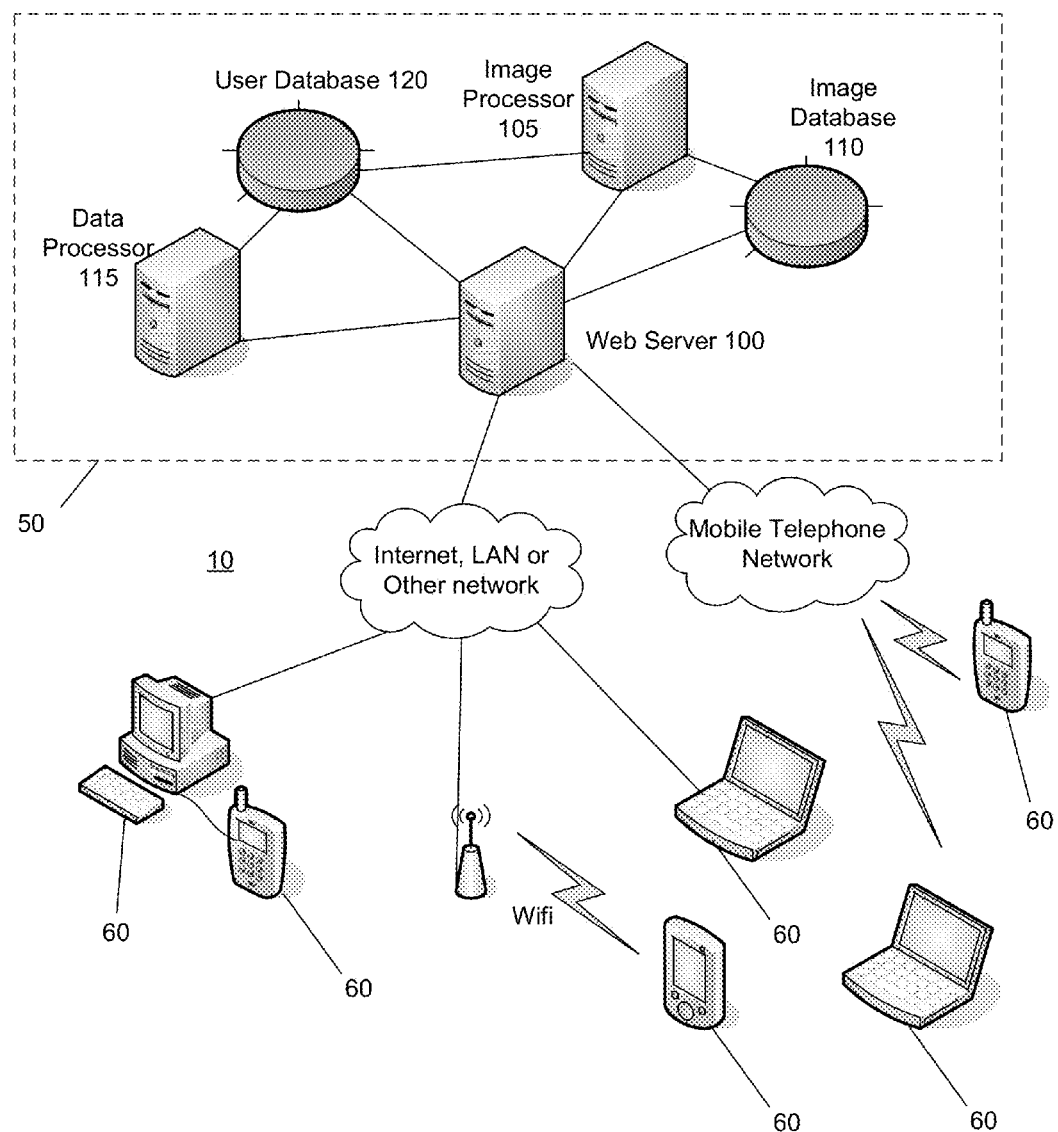
FIG. 1 is a diagram of a system environment according to an example embodiment of the present invention.

In the following description, for purposes of explanation and not limitation, specific details are set forth, such as particular networks, communication systems, computers, terminals, devices, cameras, mobile telephones, image processing, databases, communications, camera devices, servers, components, techniques, data and network protocols, software products and systems, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, communication systems, computers, cameras, mobile telephones, servers, terminals, image processing, databases, communications, camera devices, devices, components, techniques, data and network protocols, software products and systems, operating systems, development interfaces, and hardware are omitted so as not to obscure the description.

Embodiments of the present invention relate to processing images and related data, such as location data, facial data, image temporal data (e.g., time, date), and image content. The processing may result in the performance of a variety of tasks such as, for example, sorting, arranging, and/or grouping images as well as selecting advertisements, suggesting relationships between (for example) people or business, or suggesting that persons or business should communicate each other (or with another person, business or entity), suggesting and/or creating groups of users with commonalities, and/or other tasks described herein.

In one example embodiment, one or more images may be captured by a camera device. An image, as used herein may comprise a still image (sometimes referred to as a photo) and/or a video (e.g., an image with movement such as motion video captured by a (digital) video camera and that may include an audio portion)—either of which may be in a digital format. Thus an image may comprise of a jpeg, bmp, gif, tiff, RAW or other format and be captured by a camera device using a charge-coupled device, CMOS sensors or other mechanisms to capture the image. A camera device, as used herein, is meant to include any device that includes functionality for capturing an image (still or video) such as, for example, a camera (including analog, film, and digital cameras), a mobile telephone (that includes a camera), a tablet computer (that includes a camera), a computer with an integrated (or connected) camera, eyeglasses (aka goggles) that include a camera (e.g. Google Glasses® with a camera), a camera integrated into (or attached to) a vehicle (or person (e.g., a mobile telephone or watch) or clothing), or any such other device. In some embodiments, the camera device may include memory (which may be removable), a processor, a transmitter/receiver (e.g., a wireless transceiver of a mobile telephone, a mini-UBS port of a digital camera, etc.), a user interface for receiving user inputs and outputting information to the user; a display, a speaker (or other audio output device), a microphone (or other audio input device), etc. The images may be transmitted (directly or indirectly) to one or more remote computers which may comprise one or more servers (e.g., from the camera device).

The one or more computers may comprise a server associated with a website (e.g., a social network such as Facebook®, a search engine such as Google®, an image site such as ShutterFly® or Flickr®, or other site Pinterest®) for storage and/or processing and, in some instances, for posting the image(s) to (i.e., displaying the image(s) in association with the user and/or to users of the website) the user's social network (e.g., Facebook) account. In addition, location data and temporal data (e.g., time and date) captured by the camera device (e.g., by the mobile telephone, camera, or other image capturing device)—or other device—with the image (or when the image was captured) also may be transmitted and stored on the one or more computers in association with the transmitted image(s). As discussed, the image may be transmitted by, as well as captured (taken) by, a mobile telephone (that includes a digital camera for taking photos and/or videos), a digital camera, a tablet, glasses, or another device. Thus, the images may be transmitted via a communication path that includes a wireless mobile telephone network, another wireless network (e.g., WiMAX, Wifi, etc.), the Internet (e.g., via a wired connection), and/or some combination thereof. For example, the image may be taken by a digital camera, which (along with the location data and temporal data) is (subsequently or simultaneously) communicatively coupled to (e.g., wired or Bluetooth®) a computer, which transmits the image to the server(s) via the user's wired (or wireless) internet connection. If a transmitted image comprises video content, the audio portion of the image also may be transmitted and stored. It is worth noting that some camera device, such as security cameras, need be associated with a specific user or person and might instead be associated with a business, function and/or location.

FIG. 1 illustrates a system and environment of an example embodiment of the present invention. The server system 50 of the environment 10 may include a web server 100 that is configured to communicate with a plurality of camera devices 60 concurrently (or contemporaneously) as shown. The server system 50 also may include an image database 110 that stores the images and the associated image data (e.g., time and/or location data) received from the camera device 60 of the user. An image processor 105, which may comprise a separate server, may access the images and associated image related data for processing as will be described below. A user database 120 may be communicatively coupled to the image processor 105, data processor 115 and web server 100 and may store user data (e.g., user's name, birth date, passwords, mobile telephone number(s), email address(es), user preferences, connections (e.g., friends), groups, etc.) as well as image derived data (and image meta derived data) that comprises information determined from the processing of images by the image processor 105 such as the identity of persons in the images, the events attended by the user, user defined aliases, etc. A data processor 115 in communication with the user database 120 and server 100 processes the user data and image related data to perform various task such as selecting advertisements, transmitting selected advertisements, generating notifications, etc. In various embodiments, the components of the server system 50 may communicate directly (or indirectly) with any other component even if the figure does not explicitly illustrate a communication path. In addition, other embodiments may include a computer system with additional components, omit some of the components of FIG. 1 (e.g., the web server 100), and/or be comprised of different components. FIG. 1 illustrates one example of the physical components of one example embodiment of the present invention. The components of FIG. 1 also are illustrative of example functional components and this and other embodiments may include a variety of physical components to provide the functionality described herein. For example, the image processor 105 may comprise a server farm to process the images. The components of the server system 50 may be co-located or distributed (and therefore be remote from each other).

Image data may comprise data that forms part of an image to be visually displayed (and, if video, to be audibly produced). Image meta data may comprise data about the image such as the location at which the image was captured by the camera device, the time and/or date that the image was captured, the person associated with the camera device (e.g., the owner or user—which may be a default user unless another person is identified to the camera device), the person operating the camera device to take the image (if available and/or different from the owner or a default user), the size of the image file, the duration of the image (e.g., for video), the format of the image file, how large the image is, the color depth, the image resolution, and/or any of the commonly known image metadata fields (e.g., such as those adopted by the IPTC), etc. Image derived data may comprise information determined by processing an image (e.g., image processing), such as, for example purposes only, the identity of persons in the image (e.g., determined, for example, via face recognition or by the user), identity of objects in the image such as, for example purposes only, recognition of an automobile, a type of automobile, skis (any of which may be determined by image processing and/or supplied by one or more persons), and the identity of activities being performed in the image such as, for example purposes only, skiing, drinking, eating, swimming, playing a particular sport (e.g., basketball, baseball, football, etc.), reading opening gifts, etc.—any of which may be determined by image processing and/or supplied by one or more persons. Derived image meta data (DIMD) may comprise data that is determined by (or derived from) processing image meta data such as data of the event at which the image was taken (and therefore the event that persons in the image are attending). As an example, image meta data for a given image may comprise data that the image was captured at 10 AM on Dec. 25, 2011 at a particular longitude and latitude (or street address) and derived image meta data may comprise data that the image was captured on Christmas (morning) at Grandma's house. Image related data may comprise any of the data identified herein including image data, image meta data, image derived data, and/or derived image meta data.

In one example embodiment, the image may be transmitted to the remote computer, stored, and posted (to be visually and audibly accessible by the user and/or other users of the website) to the user's account (e.g., a social network profile account such as Facebook) along with image meta data such as information of the date, time, and location at which the image was captured. More specifically, at 210 of FIG. 2 the raw temporal data (e.g., time, date) and location data may be received and stored in the image database 110 at the server system 50. Some of the image meta data (e.g. location data, temporal data, camera device data, etc.) may be received with the image data and other image meta data (any identified herein such as, for example, size, format, etc.) may be determined from processing of the image by the image processor 105 for storage at 210. The image meta data may be used for a variety objectives such as to determine certain derived image meta data (e.g., to determine a user defined alias for a location, date, person, etc.) to provide a more user-friendly format when available. In another example embodiment, the processing may be performed by the image capturing device such as the mobile telephone or digital camera. For example, the date of Dec. 25, 2011 may be converted to Christmas, 2011. In some instances, a time frame may be additionally be used (e.g., fall, spring) in accordance with a user's preference supplied by the user and stored in the camera and/or at the server system 50 (e.g., in the user database 120). Ten o'clock AM may be converted to "morning" based on user preference data stored in memory. Location information, which may comprise longitude and latitude (or an address), may be converted to location name (e.g., Fedex Field, Cheesecake Factory®, Central Park, JFK airport, McDonalds® on Wilson Blvd.)). 12:00 PM on Feb. 14, 2011 (and within 5 minutes thereof) may be converted to "Noon on Valentine's Day of 2011."

Processing may take a variety of forms. For example, for each user, the server system 50 (the camera device, the user's computer, the user's automobile, and/or other computing device) may store one or more user defined aliases in association with one or more sets of location data (e.g., longitudes and latitudes or addresses), or one or more dates, one or more users in memory (e.g., the image database 110 or user database 120). For example, for one user, the user may identify each of a plurality of sets of location data (addresses or longitude and latitude) as Home, Work, Mom & Dad's house, John's school, Grandma's house, etc. A given set of dates may be defined by the user to be family birthdates. The user may supply a number of different name aliases to other users such as Mom, Dad, Sister, Son, Daughter, Chopper, Joe, etc.

Figure 2:
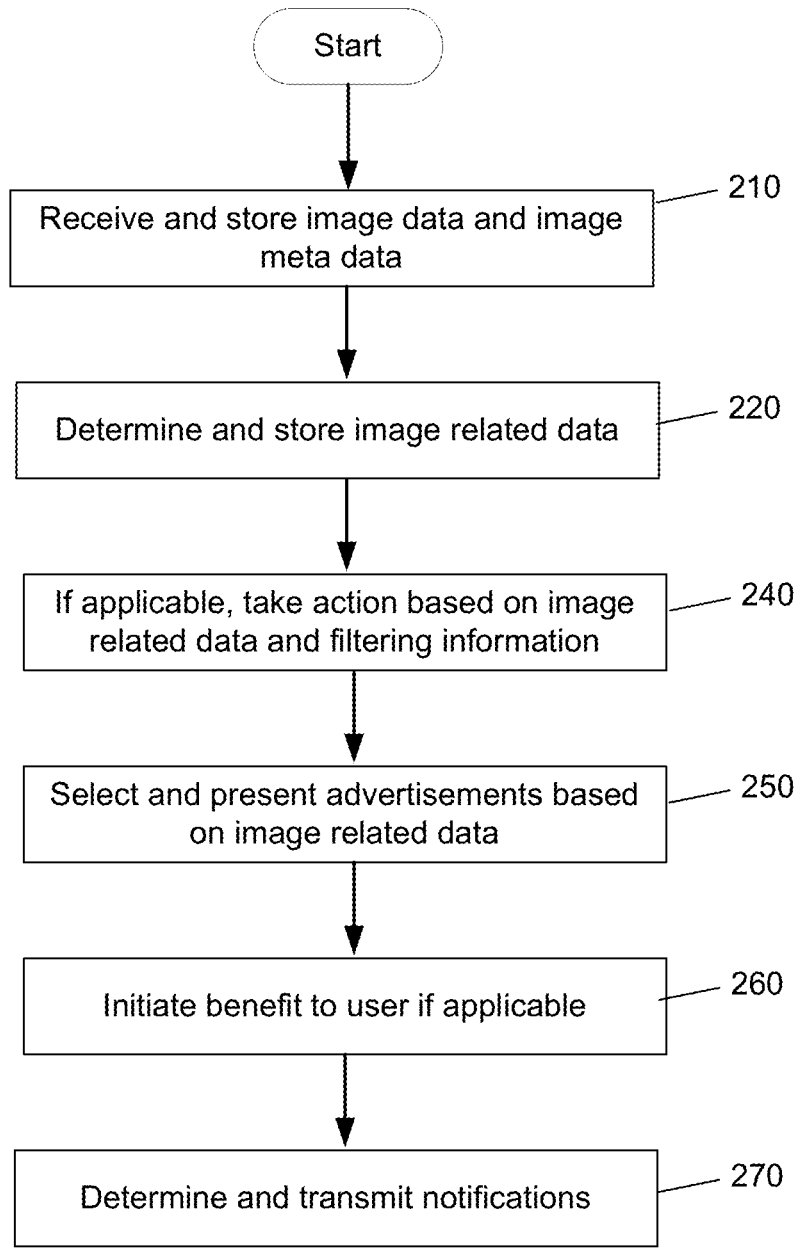
FIG. 2 depicts a flow chart according to an example embodiment of the present invention.
Figure 3:
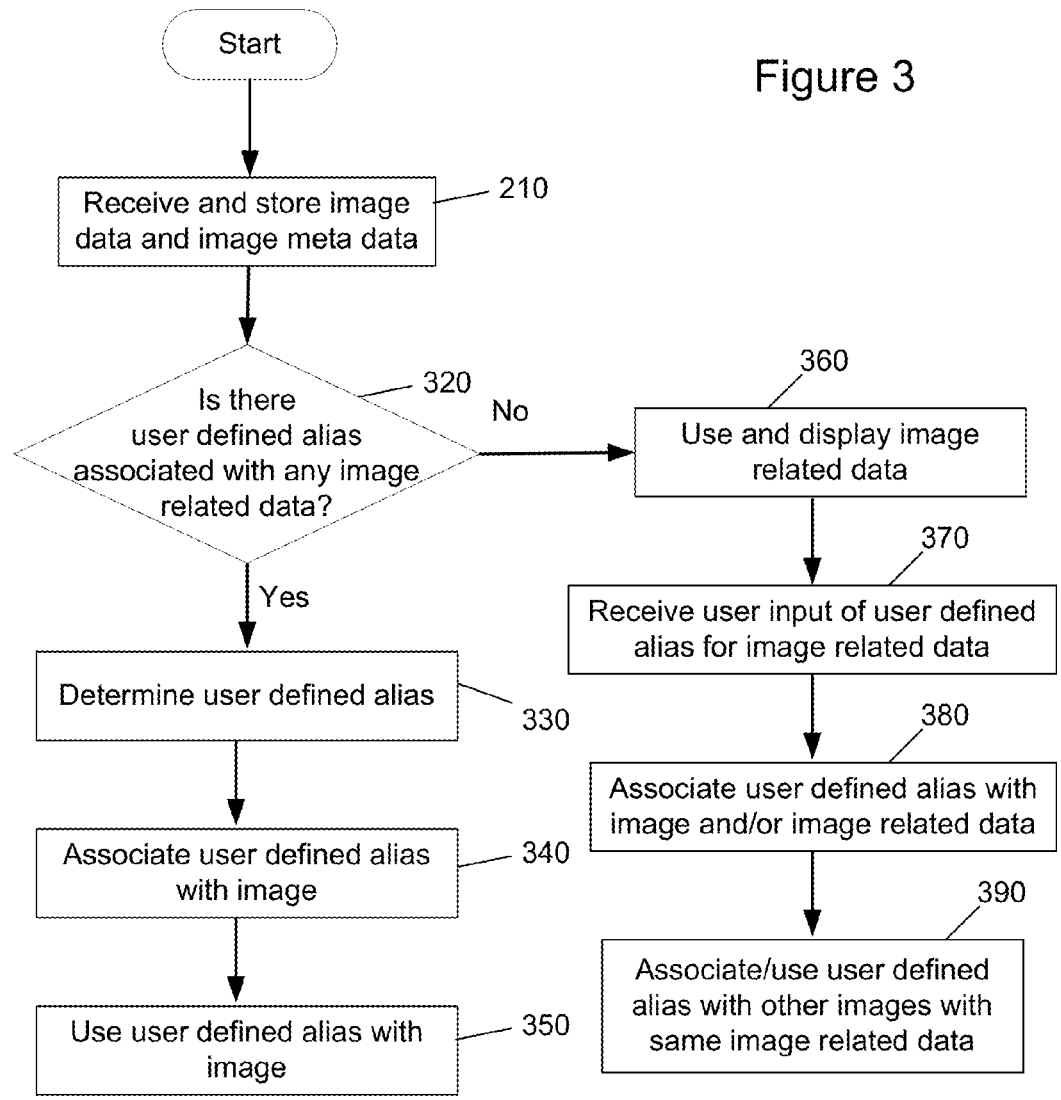
FIG. 3 is a flow chart for receiving and using user defined alias according to an example embodiment of the present invention.

Thus, the processing at 220 (of FIG. 2) may include determining if a user defined alias (or sometimes referred to herein as a user defined name) exists for a given piece of image related data (e.g., image meta data (e.g., location or date)) or derived image data (e.g., face of person in the image) associated with the image at 320 of FIG. 3. For example, this process 320 may include searching the user database 120 for a user defined alias that corresponds to a location (and/or date and/or person) associated with the image related data of a received and/or stored image. If a user defined alias exists for the image related data, it may be determined (retrieved) at 330 such as via searching the user database 120. The user defined alias may then be associated with the image at 340 (e.g., be stored in memory at 220 in association with the image) and/or be displayed (and otherwise be used) by the server system 50 (i.e., the website) instead of (or in addition to) an address, a longitude and latitude, or business name, date, person, etc. at 350, which might otherwise be displayed or used instead or alone. If no user defined alias is present at 320, the image related data (e.g., business name, longitude and latitude, address, date, person) may be used with the image at 360 such as for display (or when the user searches the images). The user may supply the user defined alias (or modify a previously supplied user defined alias) at 370 to the camera device and/or server system 50 for storage and use by editing the existing location information (e.g., address or business name, and/or date and/or person's name) that is displayed along with a displayed image or by otherwise inputting the data. Alternately or additionally, at 370 the software on the computing device storing the data may execute to access a calendar program on the user's mobile telephone, personal computer (e.g., Outlook®) or other device, to determine user defined names that correspond to dates (e.g., to determine that February 15 is "Dad's Birthday"). Calendar events may filtered (or searched) so that only calendar events that include the words birthday, anniversary, wedding, vacation, party, etc., are used as aliases. Additionally or alternately, the software may execute to access a navigation application on the same or a different device such as on the user's automobile, on the user's mobile telephone (which also may act as the camera device), or other navigation device, to determine user defined aliases that correspond to locations (e.g., to determine that a certain address is "Work" and another address is "Home"). Once the user defined alias is determined it may be associated with the image and/or the image related data in memory (e.g., in the user database 120 and/or image database 110) at 380 and used (e.g., for display) with the image instead of (or in addition to) the image related data associated with the image. Thus, a given address may be associated in memory with "Grandma's house" for example. The user defined alias also may be used in the future such as when that image is displayed in the future. Further, the process at 390 may include searching for other images having the same image related data (e.g., user/person name, location and/or date information) and (retroactively) associating the user defined alias in memory with the other images that have the same image related data (e.g., any other image captured at substantially the same location (e.g., within 100 feet), on the same date, or that includes the same person) so that the user defined alias, for example, is displayed along with such other images as well. Alternately or additionally, the user database 120 (or other database) may store for each user, all of the user defined aliases and the corresponding image related data associated with each alias. Each time an image is used or received (or at some other interval), a search of that database 120 for the image related data associated with that image may be performed to determine if any user defined alias is available for any of the image related data associated with the image (process 320). Thus, processes 320-390 of FIG. 3 may provide one example of process 220 of FIG. 2 (that is in addition to or instead of the other examples described herein). In addition, the user defined alias feature may be used to search and group images. Thus, the user could search for and view all of his/her photos taken at Grandma's house on Christmas.

Figure 4:
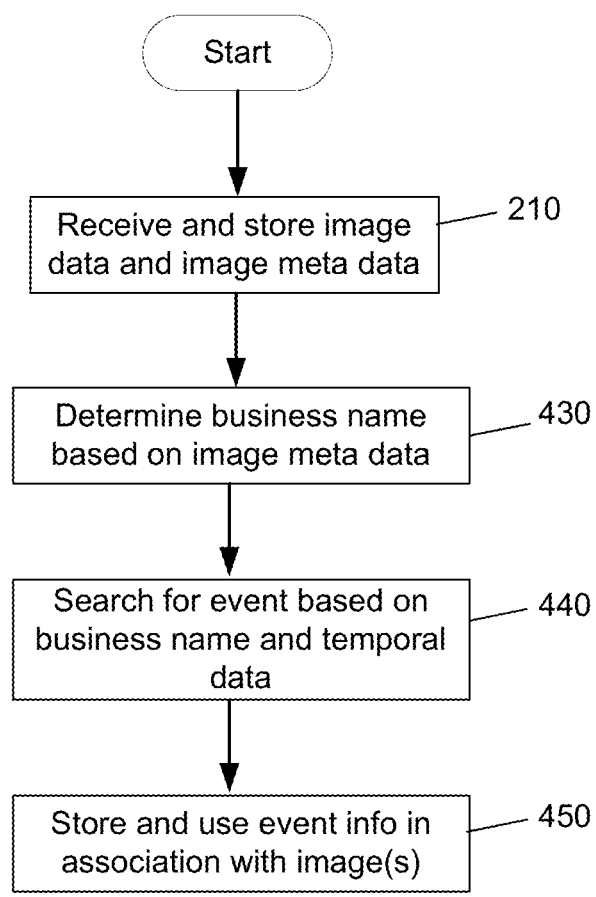
FIG. 4 is a flow chart for determining event information according to an example embodiment of the present invention.

The processing to determine image related data at 220 also may include searching one or more other databases (and/or the Internet)—which may be local or remote from the server system 50—for events at the date, time and location (or simply date and location or near the time such as within a few hours) at which one or more images were captured and storing the name of the identified event in association with the image(s) having that image related data as well as in a database of derived image meta data—data derived at least in part from the image meta data (e.g., location, time, date)—which may form part of the user database 120 and/or image database 110. Based on the location information supplied with the image, as illustrated in FIG. 4 the process at 430 may include searching a database (and/or the internet) for a business name or otherwise determining the business name or address. In some instances, the camera device may supply this information with the image. For example, based on the location data supplied (in association) with an image, the location may be determined to be Fed Ex field. Alternately, a longitude and latitude may be supplied with the image, which may be used to determine a business or other location name associated with that location data (as is well known in the art). After determining the date (and, in some instances time) that the image was captured (e.g., which may be supplied with the image), at 440 the process may include searching one or more databases (and/or the Internet) for events at Fed Ex field on the date that the image was captured and, in some embodiments, at the time (e.g., 3 PM) or near the time (e.g., within one hour, fifteen minutes, two hours, four hours, etc.) that the image was captured. As an example, the search may result in: Redskins vs Cowboys NFL game. At 450 the result of the search at 440 may be stored in the image database 110 in association with the image and used with the image in all future uses such as being transmitted for display along with the image by the server system 50 in response to receiving requests from users to view the image from a user device. Thus, instead of storing and displaying only Fed Ex Field (or simply its address), Sep. 16, 2011, the system may store and display "Fed Ex Field, Sep. 16, 2011, Cowboys vs Redskins game." In addition, the processing may further include determining the outcome of the event such as the score of the game, which also may be stored in association with the image (e.g., "Cowboys defeat Redskins" and/or "Cowboys 21, Redskins 17") and displayed along with the image.

In other embodiments, other activities (e.g., other types of events or activities other than events) also may be searched for and stored and used with the image. In addition, in some embodiments the process may include determining other images having image related data (e.g., location and date, or location, date and time) that is the same as (similar, or satisfying a similarity threshold with) as the stored image related data and using the same event data with such other images. Therefore, other images with same date (and similar time)

and location may have "Fed Ex Field, Sep. 16, 2011, Cowboys vs Redskins game" associated with them. Alternately or additionally, the user database 120 (or other database) may store for each user, all of the event data and the corresponding image related data (e.g., location and date, or location, date and time) associated with each event. Each time an image is used or received (or at some other interval), a search of that database for the image related data associated with that image may be performed to determine if any event data is available for any of the image related data associated with the image. Thus, processes 430-450 of FIG. 4 may provide another example of process 220 of FIG. 2 (that is in addition to or instead of the other examples described herein). In some embodiments, photos taken together (e.g., within a predetermined window of time and within a predetermine area or distance from each other (e.g., within 300 feet of each other) may be grouped together and accorded an arbitrary group number. All of the location and time based information that is determined may be stored only once and also associated with the same group number to, for example, reduce memory consumption.

The image processor 105 of the server system 50 (and/or the camera device 60 or other processing computer) also may automatically perform facial recognition on images received (or captured). Specifically, based on the other images stored in the image database 110 (and in some embodiments, based on images in other databases that may be local or remote from the server system 50) that include faces of a person that has been identified in the image (a "tagged" user, e.g., information supplied by the same or other users of the web site), the faces of people in each received image (by the server) and image captured (by the camera device) also may be identified. When users send images to the server system 50 for storage, they may be asked to demarcate (e.g., place a rectangle around) each person's face and to identify the person (or other user of the social network) associated with the face. Thus, for some images the image database 110 may store information of the area of the image that corresponds to a user (or person) and the identity of that person (who may or may not be a user of the web service or social network). The camera device also may ask for such information and store the user's response (and, in some embodiments, transmit that information to the server).

Figure 5:
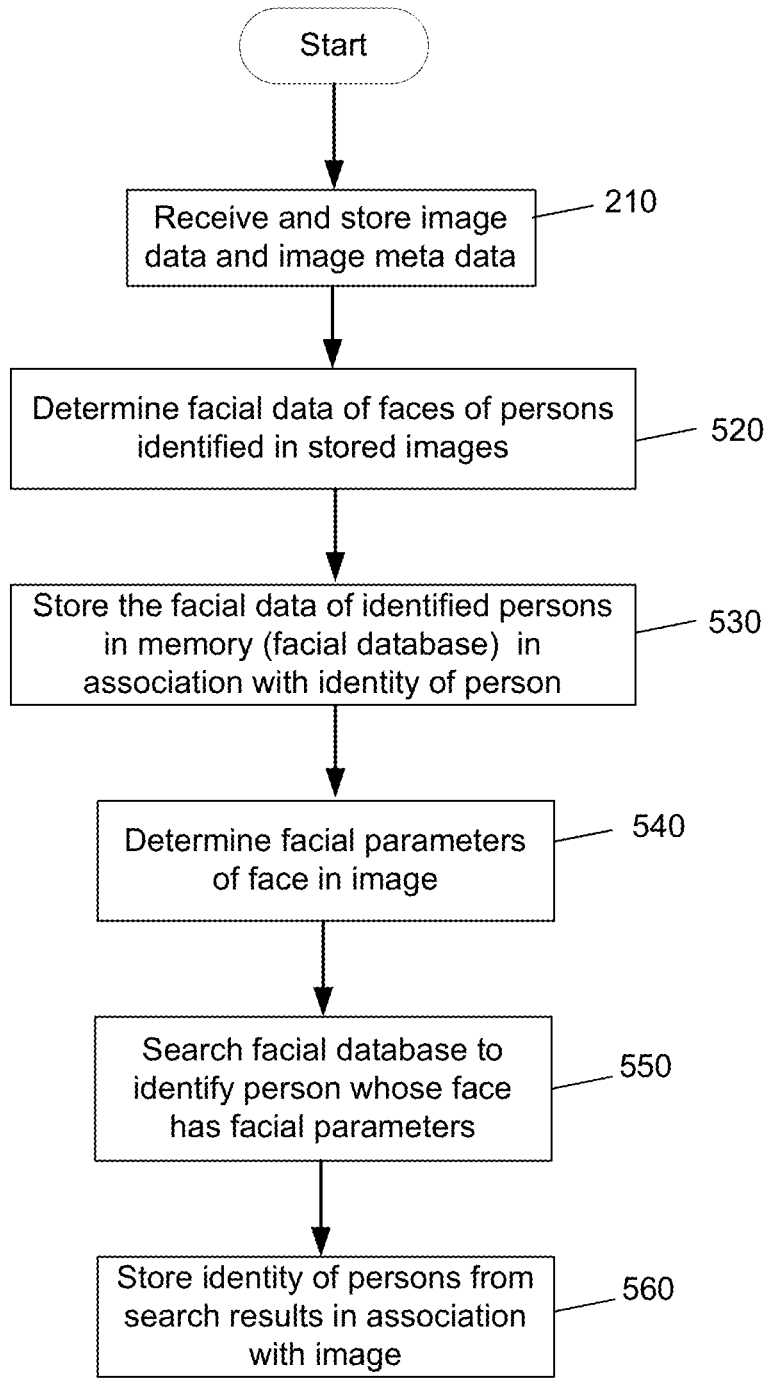
FIG. 5 is a flow chart for performing facial recognition according to an example embodiment of the present invention.

The image processor 105 also may process facial data that is intrinsic in the images stored in the image database 110 by determining certain facial features of each face identified in each image (e.g. the distance between certain facial features). The camera device 60 also may perform such processing of images captured. The determined facial features may be compared with the features of faces of known persons in a facial database (which may form part of image database 110 or another database). The processing may occur within minutes or seconds of the storage (or capture) of the image (e.g., may be queued for processing at storage) or may processed some time after storage such as at time periods of increased available processing capacity. Thus, referring to 520 of FIG. 5, for each user identified by a user in any image (or having a face otherwise recognized), the image processor 105 may store one or more sets of facial data (e.g. one set for each person identified or demarcated) in the image database 110 (and/or the user database 120) in association with the identity of the person at 530. The server system 50 (or camera device) may then use the facial data of a multitude of users as a facial database to identify persons in newly received and/or stored images. More specifically, at 540 the processing may include determining one or more facial parameters of a face forming part of an image for which the facial data has not been (successfully) processed such as a newly received image. At 550 the process includes searching the facial database for facial parameters satisfying a similarity threshold with the facial features of each face in the image to identify the person(s) whose face(s) is (are) in the image and whose face has those facial parameters. In addition, information of the identities of the person(s) identified in each image may be transmitted to the server 100, which may then be sent to the camera device (e.g., mobile telephone) or computer for confirmation of the identity(ies) by the user (if known). If confirmation is received from the user (or if the user does not indicate the facial recognition is incorrect), data indicating the confirmation may be stored in the database 110 (including the facial database) and the image may then be (automatically) posted to the profile page of the user supplying the image and/or to the user accounts (e.g., profile pages) of the users of the social network (or other web service) whose faces are identified in the image. In addition, at 560 the identities (i.e., names and/or user defined aliases) of the persons whose faces are recognized (and in some instances confirmed by the user) may be stored in memory in association with the image (e.g., in the image database 110).

As stated, the user may review the facial recognition and confirm the identities of the people in the image (which confirmation may be sent to the server). Upon receipt of an incorrectly identified user, the user also may transmit information correcting identities of persons in the image (which correction data may be sent to the server 100 for storage and display and for posting to such correctly identified users' accounts).

Various methods of performing facial recognition may be employed. One method of performing facial recognition is by comparing selected facial features of each face in an image with the features of faces in the facial database. Thus, the server system 50 may store a facial database (e.g., in the user database 120, the image database 110, another database, or some combination thereof) with a plurality of records that each include facial parameter data that defines the relationship (e.g., spacing, size, ratios, etc.) between various facial features of faces and information identifying an associated user (or person) to whom the face having that set of facial parameter data belongs. In some instances, some of the faces in the facial database may comprise faces of people who are not users of the web service (e.g., social network) such as, for example, celebrities, politicians, and the like. In addition, in some embodiments there may be multiple sets of facial parameter data (from multiple images) for each person. Various embodiments may include a facial database with other facial parameter data. Various architectures may be employed. For example, instead of the server system 50 performing the processing, each camera device 60 may perform the facial recognition by accessing a locally stored facial database (that might include data of faces of persons who are friends with the user or of which the user has previously captured an image). Alternately, the camera device may access a remote facial database (e.g., at the server system 50 or elsewhere) to perform facial recognition. In either case, information of the identified persons, and in some instances, the facial data (e.g., ratios, spacing, size, etc.) may be transmitted to the server system 50 (and/or elsewhere) for storage such as for storage in association with the image and the facial database—which may be especially helpful where the processing did not result in recognition of any person and the identity of the person was supplied by the user. Finally, once a person is identified via facial recognition, the processing (by the server or the camera device) may include determining the alias for the identified person and using (e.g., displaying) the alias along with the image.

In addition to the above, the processing of the images, such as process 220 in FIG. 2 may include identifying other content in the images such as, for example, skis, a football, a boat, a car (and the make and model), clothing, items that include text (e.g., books, CDs, signs, etc.), bar codes, QR codes, and other items. Thus, the image processor 105 also may process each received image to identify one or more content items (objects) in each image (in addition to one or more faces) and store information identifying the one or more content items in memory in association with the image such as, for example in the (1) user database 120 in association with the user supplying the image or the users who are in the image (e.g., determined via facial recognition) and/or (2) image database in association with the image. In one embodiment, the server system 50 may store (or have access) to an image content database that includes content parameter data for a plurality of content items. Thus, data of parameters of content items (e.g., spacing(s), ratios of length to width, color, shape, etc.) in images may be determined and compared with the content parameter data of the image content database to identify the items. The content item of the image may be identified, for example, by determining that the parameter data of a content item in an image satisfies a similarity threshold with the parameter data of an item of the image content database. Like the facial database, the data in the image content database also may be supplied by users who supply information demarcating an area of an image that includes the item as well as information identifying the item (e.g. football). In one embodiment, after a plurality of users have identified a content item and/or a sufficient similarity between the parameter data of a plurality of parameter data of a (user) identified content item is satisfied, one or more sets of parameter data for that content item (e.g., football) may be stored in the image content database in association with the name of the item (e.g., football). This same process may be used for faces. Thus, in one embodiment, the users of a network may build the facial and/or the content item database.

Thus, the image processor 105 may process the image to determine a variety of parameters (e.g., color, shape, height-length relationship, etc.) of an item that may be demarcated or in some instances not demarcated. In either instance, the parameters of an identified item in a received and/or stored image (or image captured and processed by the camera device) may be compared to the parameters of items in the image content database in order to identify a given item in an image. If a similarity threshold is satisfied between the parameters of an item in an image and the parameters of an item in the image content database, the identity (e.g., name) of the item in the image may be stored in the image content database in association with the image and the location of the item in the image.

In addition, the image processing at 220 may include optical character recognition (OCR) of textual content in the image. Thus, text in an image also may be recognized and converted to ascii or another format such as through OCR or another method. The recognized text (e.g., ascii) may be used to recognize content in the image (e.g., the famous a sign that says Vegas or a Miller Lite beer or text on a T-shirt). Alternately, the text may simply be part of the background (and thus not be of significance) or part of the subject matter to be captured (e.g., a bumper sticker). Thus, the server may recognize that a user is wearing a shirt and that the shirt includes the word "Cowboys" or simply that the word "Cowboys" is of a certain size (e.g., greater than a predetermined size, encompasses greater than a predetermined percent of the image, etc.) in the image (and therefore significant to the person in the image or the person capturing the image). Consequently, the user may be presented ads for the Cowboys or Dallas Cowboy related ads. Alternately, the image processing may recognize an item as a car and the OCR may determine that the word "Ford" and "Mustang" are "on" the car and thereby recognize that the image includes a Ford Mustang car. Thus, data resulting from character recognition may be used in conjunction with other image related data (e.g., IMDD, image meta data, image derived data) such as identified content items to more clearly identify items in an image, to select advertising, transmit notifications, connect people with common interests, and/or to perform other actions.

Similarly, as part of the processing 220 a QR code may be converted to text, which may comprise a URL, a telephone number, a message, and/or other information. A bar code may be converted to information such as product information (e.g., where the bar code is a universal product code or UPC), which may include converting the bar code to a number and searching a database for a product associated with that UPC or other bar code data.

In some embodiments, the user may supply information to be associated with an image just captured. For example, in one embodiment the user may speak (into the camera device) a phrase (or sentence) that provides information related to the subject matter of an image (hereinafter a user supplied oral annotation) or manually enter the information via typing. For example, after capturing the image, the user may actuate an audio input mechanism (e.g., microphone) on the camera device and say "Mom, Dad, and Grandma at my home on Jul. 4, 2011, playing football." The spoken content may be stored (e.g., as an audio file and/or be converted to ascii or words by the camera device via speech-to-text algorithm) in association with the captured image in the camera device and transmitted with the image to the server system 50. Thus, the camera device (e.g., mobile telephone or digital camera) may include a microphone to capture audio which is stored in memory and converted to words by a voice recognition module (e.g. speech-to-text software), which may store the recognized words in memory. A processor in the camera device may then cause a transmitter to transmit (e.g., wirelessly) the image (including the image metadata), the recognized words (e.g., as ascii), and, in some embodiments, the actual voice recording. In some embodiments, the server system 50 receives and converts the audio file to words via voice recognition processing and stores the words in memory in association with the received image. Thus, the server system 50 may receive the audio (as a recording or via a live connection with the user) and may utilize a voice recognition module to convert the audio to words (e.g., ascii) for storage and processing. In one embodiment, the user may need to describe the subject matter of the image in a predetermined order such as person in the image, location of image, date of image taken, and activity (as in the example above) to allow the parsing of the converted text to result in the correct storage data. In other embodiments, the user may describe the image in any manner—in any order and include any content. In addition, the spoken content (or a portion thereof) may be used as the file name for the image and/or a caption to be associated with the image and displayed by the server system 50 (or user's computer, camera device, etc.) when displaying the image. Information in the user supplied oral annotation associated with an image also may be processed (as described herein) to determine information about the image, the user, other persons in the image, activities, location, etc. and such information may be used (as described elsewhere herein) such as to select advertising, create groups, transmit notifications, etc. For example, if the user refers to someone's house or home (e.g., Steve's house) in the user supplied oral annotation, the server system 50 (or camera device) may store and use "Steve's house" as a user defined alias for the location at which the image is captured, wherein the location (e.g., address or longitude and latitude) at which the image is captured is supplied with the image as image meta data as described herein. As another example, if the user refers to someone's birthday or anniversary (e.g., Shawn's birthday) in the user supplied oral annotation, the server system 50 (or camera device) may store and use "Shawn's birthday" as a user defined alias for the date (e.g., June 9) on which the image is captured, wherein the date (e.g., June 9) on which the image is captured is supplied with the image as image meta data as described herein. Thus, the server system 50 (or camera device) may include software for searching for key terms (e.g., house, home, anniversary, birthday, etc.) in user supplied oral annotations (and manually supplied (typed) annotations). If a key term is found, the software may then select one or more additional words from the user supplied oral annotation to be used with the key word as a user defined alias for a location or date. For example, upon finding the key word home (or house), the preceding word (Steve's)—or the preceding three words if any of the preceding three words is "and" (Steve and Jenna's)—may be used with the key word (home) as a user defined alias (Steve's home or Steve and Jenna's home) for location data supplied with the image. As another example, upon finding the key word birthday, the preceding word (e.g., Shawn's) may be used with the key word (birthday) as a user defined alias (Shawn's birthday) for a date (June 9) supplied with the image. As yet another example, upon finding the key word anniversary, the preceding word (Steve's)—or (additionally or alternately) the preceding three words if any of the preceding three words is "and" (Steve and Jenna's)—may be used with the key word (anniversary) as a user defined alias (Steve and Jenna's anniversary) for the date (March 1) supplied with the image. In other embodiments, more sophisticated processing may be performed to determine aliases. In each instance, once the user defined alias is determined, it may be stored in memory, used with the image, and used with other images (previously and/or subsequently supplied) having the same location (i.e., a location that satisfies a similarity threshold with the original image) and/or date as described elsewhere herein. Thus, the process may include receiving a user supplied (e.g., oral or manual) annotation to be associated with an image and receiving the image and image meta data that comprises at least one of the date and location at which the image was captured. The process may include converting the user supplied annotation to a searchable format (if necessary) such as by performing speech recognition or converting it to ascii. The process may further include searching the user supplied annotation for one or more key words. If a key word is found, determining (e.g., such as based one or more other words (e.g. the preceding one or three) to be combined with the keyword) to determine a user defined alias. The process may further include storing the user defined alias in memory in association with one or more pieces of image meta data supplied with the image and using (e.g., displaying) the user defined alias with the image (in addition to or instead of using the image meta data (e.g., date or location) as well as using (e.g., displaying) the user defined alias with other images having the same meta data (e.g., date or location). Thus, the user defined alias may be stored in the user database in association with that user. This processing and displaying may be performed by the camera device, the server system 50 or some combination thereof.

As discussed, the user also may supply a manual or oral annotation that identifies one or more persons in the image. If only one person is in the image, the processing (by the camera device or server system) may extract data of the facial parameters of the person in the image and store the facial parameter data to the facial database in associated with the person's identity. If multiple persons are in the image, the user may identify them from left to right and the processing (by the camera device or server system) may extract data of the facial parameters each person from left to right in the image and store their facial parameter data to the facial database in association with their identity.

If the annotation includes a complete proper name (e.g., John Madden), the server system 50, upon reception of the image, may notify (1) any user with that name that they are identified in a newly posted image; (2) any user with that name that is "connected" to the user supplying the image (e.g., a "friend" on Facebook) that they are identified in a newly posted image; and/or (3) perform another action.

Alternately, the server system 50 may more accurately identify the person before transmitting the notification. For example, the server system 50 may then initiate the facial recognition processing to determine if the facial parameter data of the person in the image satisfies a similarity threshold with the facial parameter data of any of the user's friends with the same (or similar) name (i.e., satisfying a similarity threshold)—and, if not, then initiate facial recognition processing to determine if the facial parameter data of the person in the image satisfies a similarity threshold with anyone in the facial parameter database.

If the annotation includes only a first (proper) name (e.g., Steve, Alyssa, Max, Chase, etc.), the server system 50, upon reception of the image may search for users who have a connection to the user supplying the image (e.g. a user's Friend). The server system 50 may then initiate the facial recognition processing to determine if the facial parameter data of the person in the image satisfies a similarity threshold with the facial parameter data of a user's friend who has the same (or similar) first name (i.e., satisfying a similarity threshold). For example, if the user supplying the image has friend named Steven and another named Stefan each of their facial parameter data may be compared to the facial parameter data of the person in the image (wherein the user's oral annotation included "Steve") in sequence until the user in the image is identified (e.g., facial parameter data of image and person satisfy a similarity threshold). Once the person in the image is identified, their contact information (e.g., email, User id, etc.) may be retrieved and used to transmit a notification indicating that an image that includes them has been uploaded/posted.

In some instances, the user may supply an oral annotation that includes an existing user defined alias such as Dad, Mom, Grandma's house, Nat' Birthday, etc. Thus, in addition or as an alternative to the above, the server system 50 may (first) search the user defined aliases associated with the user supplying the image for all or only some of the user supplied annotation terms. For example, the server system may search the database for the terms Dad and Mom to identify the public names of the person's in the image, which might be, for example, John Smith and Jane Smith. Once identified, the server system 50 may then transmit a notification to the identified users indicating that an image that includes them has been uploaded/posted. The server system 50 may search for each term of the annotation or store a list of terms that trigger a search of the user defined aliases that are often used as aliases such as Dad, Daddy, Pop, Pappa, Father, Pap, Mom, Mamma, Mommy, Ma, Mother, etc.

Some of the images supplied may comprise video content that includes an audio portion. The audio portion also may be processed at 220. Specifically, the audio portion of a video may be processed through a speech-to-text algorithm to convert the audio to text which includes searchable words, phrases and sentences. Various software programs for converting spoken words to text (ascii words) are available commercially and any suitable program may be used that satisfies the design parameters of the system including a speech recognition algorithm that recognizes words, which may then be converted to text for storage and processing.

The processed audio (e.g., text) may be further processed to provide additional image related data (either along with or in conjunction with data supplied by the user or other image related data) that may include information about one or more person's in the video, the location at which the image (video) was taken, an event at which the image was taken, an activity of persons in the video, and/or other information.

A plurality of images may be stored in a database (e.g., on the mobile telephone, on the camera, on the server system 50 (image database 110), on the user's computer, and/or elsewhere) with a number of different fields that store various image related data (which may be supplied by the camera device, the server system 50 (through processing), the user, and/or via other means). Specifically, for each image, the storage mechanism (e.g., database) may include the following fields associated with each image: date the image was captured (and any information corresponding to the date such as a holiday (e.g., Christmas) or user defined alias (Dad's Birthday)), the time the image was captured, identity of person(s) in the image (or information sufficient for identifying the persons such as a user ID), information identifying the location of each person's face in the image (e.g., provided by the user and/or processing), raw location information (e.g., longitude and latitude), information of the address at which the image was captured, location name (which may hold the business name and/or a user defined alias for the location), information of an event at which the image was captured, recognized audio (i.e., for video content the audio portion may be converted to text and stored), recognized text (e.g., text determined via OCR), the identity of recognized content items, any annotation supplied, information identifying the user supplying the image, information identifying the device capturing the image, information identifying the model and make of the device capturing the image, and a variety of other information described herein and other data. In addition, facial parameters of each person identified in each image also may be stored—although such data need not necessarily be stored in association with any particular image (but could be) even though the facial parameter data may be derived from one or more images.

Users may elect to permit only select photos to be processed such as for facial recognition and/or content item recognition. Users also may permit only select image data (e.g., selected based on time, location, persons in image, items in image, etc.) to be used to select advertising or to be used for other purposes (e.g., to be posted, to identify persons, to identify content items, to be used to sell products (e.g., to be hyperlinked to a web page of one or more products for sale), etc.). The user may supply filtering information (that is stored on the server system 50 in memory in association with the user) that indicates which image related data (e.g., associated with which certain locations, that include certain people, that include certain activities, taken after or before certain times of the day, taken on certain days of the week, that include certain types of events, etc.) to be excluded (or only those included) for processing, to be used to select advertising and/or for other purposes (e.g., to be posted, to identify persons therein, to identify content items therein, to be used to sell products (e.g., to be hyperlinked to a web page of one or more products for sale), etc.).

Referring to FIG. 2, at 240 based on data of the location, time, and/or other image data (and the user supplied filtering information), the image (and/or the image related data) may be processed differently, transmitted to one or more different (or additional) destinations for storage and/or further processing and/or another action taken. For example, images taken before 10 PM may be posted (stored for display to one or more other users) to the user's social network account while images taken after 10 PM or taken at the user's work may be stored but not automatically displayed via the account (and instead may be stored on the user's computer, the server system 50, the user's mobile phone (or camera) or posted to a different account (the user's Flickr account). An image that includes the face of the user's co-worker similarly may not be automatically posted (or transmitted) to the user's social network account and instead stored on the server system (and accorded a privacy setting so other users or only select users can view it), the user's computer, mobile phone (or camera) or posted to a different account (the user's Flickr account). However, any image that includes a face of the user's spouse, any of the user's children, parents, in-laws, siblings, relatives, pets, taken at home, a particular content item, or taken at a football game may automatically be posted to the user's social network account (with the identified people in each image identified in the caption of the image) and transmitted (e.g., email, text message) to the identified user(s) (in some embodiments after asking the user if the photo should be sent and in other embodiments sent automatically without such a prompt if the user supplied configuration data so indicates).

The image file may be assigned a named with a combination of different image related data followed by a differentiator (e.g., a number inside a parenthetical to distinguish between different image files that would otherwise have the same name). For example, the image file may be named as the (a) location and date or user defined alias equivalent (e.g., "Grandmas Christmas 2011 [4]"; Home-8-25-11 [1])"; (b) location, date, and event (e.g., "FedexField 9-1-2011 Cowboys Redskins game [7]"); (c) location, date and person(s) (e.g., "Johns Home—Thanksgiving 2010—John Steve and Jane [2]"; "Cheesecake Factory—Thanksgiving—Mom Dad and Me [6]"); (d) location, date, and activity (e.g., Home—Jul. 4, 2010—Playing baseball [4]"; and/or (e) any combination or subset of image related data. The user may supply image naming preferences, (which may be stored on the server system 50 and/or camera device), that is used to determine the image related data to be used to name each image data file. Thus, in some instances (such as when identities of persons are used as part of the file name) the image file may be assigned its (final or user preferred) name after processing (and may be accorded at least a temporary file name until the server re-names the image file). Alternately, the image file may be accorded an alpha-numeric file name (e.g., by the camera device and/or server system 50) for use by the storage mechanism and displayed with (and be searchable via) the alternate file names as described in this paragraph to allow the user to quickly determine the content of the images.

A database of characteristics (which may form part of the user database 120) may be determined and stored for each user based on image related data (e.g., location data, temporal data, event data, recognized content items, user characteristics, activities, locations visited, etc.) associated with images supplied by the user and by other users (wherein the user is in the images supplied by the other users). Such characteristics about each user (which may be used to select advertising) may include, for example, the color of the person's hair, the length of hair (or baldness), gender, the skin color, the ethnicity, height, weight, whether a person is overweight or not (or degree of overweight), the clothing style worn, whether hats are worn, whether eyeglasses are worn, whether sunglasses are worn, whether (and what) sports are engaged in, sporting events attended, locations visited, events attended (e.g., concerts, sports events, horse races, etc.), whether a type of location is visited (e.g., a beach, a ski resort, bar, library, fast food restaurant, high end restaurant, jewelry store), hobbies, beverages drunk (Bud Light), types of beverages drunk (e.g., tea, beer, wine), color(s) of clothing worn, favored color(s) of clothing, types of clothing and/or jewelry worn (e.g., bikinis, shorts, suits, high heels, hats, ties, watches, rings, etc.), where the person lives, type of residence (e.g., apt., house, condo, etc.), products consumed, furniture owned, foods eaten, types of foods eaten (e.g., fast food, candy, Chinese, etc.), sexual orientation, type (e.g., make or year, make and model) of automobile owned (and/or driven and/or favored), activities engaged in (e.g., skiing, fishing, dancing, etc.), age, events attended (e.g., Redskins vs Cowboys), type of events attended (concert, pro football game), and/or type of sports event attended (college basketball game, pro baseball game). As discussed, some of this information also may be derived from GPS data supplied by the user's mobile telephone, supplied by the user, or supplied via another method or device. In addition, some of this data may be determined from purchases made by the user when using the user's mobile telephone to make a purchase (and therefore transmitted/supplied from the mobile telephone or other camera device), and/or via other methods. Ads may be selected and transmitted to the user's camera device (e.g., mobile telephone), a web page viewed by the user (such as on the web page of the user's home page when accessing the social network), a digital set-top box associated with the user that is connected to a television, a heads-up display device (e.g., in a vehicle or eyeglasses) or any other suitable device.

In some instances, image related data of multiple images may be processed to determine information about the user such as that the user attends all the home games of a particular sports team and, therefore, likely has season tickets to the home team—in which case ads selected for the home team may be presented (instead of any of the visiting teams) as well as ads selected for people who like that type of sporting event (e.g., pro football).

In one example of such processing, certain ads may be selected if multiple images taken on different dates (e.g., days, months, years) that include (show) the user and certain items (e.g., skis), the user at a certain type of sporting event, the user at a certain location (other than at home—based on image related data), which may indicate that the user has a greater interest in the item, type of event (e.g., sporting event, football game), or location—more than other users who may not have the location, event, or item in any images, in images taken on multiple days, as regularly, or as in as many images on different dates. Thus, the process may include determining one or more common parameters of a plurality of images associated with a user (including the user and/or supplied by the user) taken on different dates to generate ad selection criteria and based on the common parameter(s) (1) selecting advertisements; (2) prompting the user to join certain group; (3) communicating notifications identifying other persons with similar or the same interests (e.g., common parameter(s)); (4) and/or one or more other actions taken.

Based on location and/or time associated with one or more images captured by the camera device and/or posted to the user's social network (e.g., from the user's mobile telephone), common parameters among multiple images and other data described herein, an advertisement may be transmitted to the user's mobile telephone (or computer or other presentation device) at 250. For example, an ad may be selected based on the user's real time location (e.g., as determined by the GPS of the user's mobile telephone and/or the location data of the image transmitted to the server). Thus, if the user transmits an image to the server system 50 (or the user's mobile phone transmits location data of a captured image) while at a professional football game, an advertisement (e.g., text message, email, etc.) may be transmitted to the user's mobile telephone (or heads-up display eyeglasses) that includes a coupon for a discount on a product sold at (or near) the location that the image was captured or an anticipated location of the user that is based on the location that the image was captured. The advertisement may include text, graphics as well as a non-user intelligible code such as a bar code or QR code that when displayed by the mobile telephone at the advertising vender is read by a scanner at the vender which processes the code to facilitate the discount or other financial benefit to the user.

Other image data also may be used to select advertisements. For example, event data may indicate that the user is at a Redskins vs. Cowboys game (that is being played at the Redskins home field). Based on this information, a discount coupon to a Redskins store (that sells Redskins products) in the stadium (or that is located along route from the stadium to the user's home) or online may be transmitted to the user's mobile telephone. In addition, a discount coupon to a store that sells Cowboy products in the stadium (or that is located along route from the stadium to the user's home) or online also may be transmitted to the user's mobile telephone. Thus, the real time ad may be selected based on the event (i.e., the teams playing in the game) the user is attending as well as the location of the user (the stadium) or anticipated location of the user (the route from the stadium to the user's home). The time that a user captures the image also may be used to select the advertisement. For example, if the image meta data indicates that an image was captured at 7 AM, an real time advertisement (e.g., an ad selected based on real-time data (location or time data that is not older than five, ten, fifteen, or thirty minutes or one hour)) with a breakfast coupon may be transmitted to the user's mobile telephone. The advertisement may further be selected based on real time user location data (determined from the image meta data or from a the user's mobile telephone in response to a query from the server system 50) or anticipated location (determined based, at least in part, on the user location data). The advertisement also may be selected based on an outcome of the event (e.g., who won the game).

Based on image related data that may include data of the time, date, event, identities of people in the image, content items in the image and/or other information in the user database advertising may be selected to be presented to the user supplying the image, viewers (persons other than the user supplying the image) who view the image(s) on the website or elsewhere, and/or users who are identified in the image. The user(s) may agree to receive (or view) the advertising (e.g., on the website, a digital set-top box associated with the user that is connected to a television, in text messages and/or emails) as compensation for using the service and/or performing the image processing and/or storage by the server system 50. Thus, at 260 the process may include initiating a benefit to the user (1) in response to receiving an indication that the user has viewed the ad (e.g., receiving confirmation from the user such as by providing a user input); (2) after the ad is transmitted to the user or displayed by a user device; and/or (3) in response to another ad related activity. The benefit may be a financial benefit such as receiving frequent flier miles, reward points, loyalty reward points, a financial transaction (e.g., a credit to the user's credit card, etc.), etc.

In some embodiments, certain portion(s) of a user supplied image that is displayed (e.g., an area of the image corresponding to the portion identified as a content item) may be "hyperlinked" to a web page (hosted on the same or a different server) that offers the identified content item (e.g., Spalding® football), a similar product (a Nike® football, a basketball, etc.) or a related product (e.g., a pair of tennis shoes) for sale and wherein the webpage (and server serving the advertising webpage or receiving a request from the advertising webpage) is configured to facilitate (or process) a sale of the offered item. Thus, an item may be identified in the image and an associated item (the same item, a related item, or item selected based on the identified item) offered for sale. For example, a photo of people playing football in which the football is identified in the image may result in an offer for sale of other sports items or clothing (e.g., a sports jacket). Other images may result in other articles of commerce (products or services) being offered for sale such as automobiles, shoes, hats, jewelry, food, tickets to sporting events, airline tickets, etc. Mousing over an item in an image may cause the identified item to be demarcated (e.g., highlighted, outlined, a pop up with the price, etc.) to indicate a hyperlink is available. Different demarcations (e.g., different color of outline of the item) may indicate different types of linked web pages (e.g., blue outline indicating a related item and red indicating that the item itself is offered for sale on the hyperlinked webpage). Information about a product also may be determined by the server. For example, the fact that a leather jacket is worn by a man may be determined from facial recognition and the hyperlink may then be to a men's brown leather jacket. In some embodiments or scenarios, the content item may not be demarcated and the entire image may be hyperlinked to a web page offering the product for sale or a number of products for sale in which the product for sale (or ad) is selected based on one or more items identified in the image, the location of the image, the event associated with the image, the gender of persons in the image, the age of persons in the image, the activities being performed by persons in the image, the hobbies of persons in the image, and/or other image related data. In some embodiments, mousing over the image (or identified content item)—or otherwise providing an input indicative of the user's interest—may cause a pop up window (or cascaded layer sheet) to display information about the product(s) for sale (images and/or text showing price, availability, sizes, colors, shipping costs, taxes, model, manufacturer, etc.) that includes (1) a link to the web page with additional information and that allows the user to initiate the purchase; and/or (2) a form that allows the user to initiate the purchase.

Users of such networks typically enter information about themselves such as their gender and other information (e.g., birth date, city of residence, marital status, hobbies, home town, etc.). Consequently, once the user is identified in an image (e.g., such as through facial recognition or by the user), the data processor 115 of the server system 50 may process other data stored in the user database 120 that is associated with the identified user (such as gender information, hobby information, age information, and/or other other information supplied by the user) to determine that the jacket worn by the person in the photo is very likely a man's jacket. As another example, a child's toy may be recognized and linked to an Amazon.com® page that offer's the child's toy for sale that is the same or similar (e.g., same toy with different color or different toy for same age range) as the toy in the image.

Coupons, ads, discounts, promotional events, sales, freebies, and other promotions related to an item in a photo (e.g. Budweiser) may be offered to the user who supplied the image, any user recognized in the image, anyone who supplies an input or otherwise indicates that they appreciate or enjoy the image photo (such as by clicking a "Like" button on Facebook), the person contacting (e.g., holding) or using an identified item in the image, a user who comments on (or supplies an input regarding) the image, and/or a user who views the image in a predetermined manner (e.g., clicking on a smaller image to view an enlarged image or otherwise).

The type of clothing a person wears (e.g., t-shirt versus a suit or colored long sleeve shirt) as "recognized" in a image also may be used to select adverting content in conjunction with information supplied by the user. For example, the user may indicate his gender and birthdate and image processing may determine (with reasonable, but not absolute certainty) that he is a skier because he is holding skis in a still photo and, therefore, advertising may selected for male skiers (which may include various advertising for ski items and other items that males who ski and are of the user's approximate age are more likely to purchase—but that are not necessarily related to skiing products or services). Location information of images also may be used to select advertising. For example, a user may indicate that they are from Washington D.C., but location information associated with some images (supplied by the user, camera device, or by supplied another person and in which the user's face is recognized) may indicate that the user travels to Las Vegas Nev. on occasion, regularly, or intermittently, and therefore advertisements associated with venders servicing Las Vegas Nev. (e.g., casinos, airlines, restaurants, etc.) may be selected and presented to the user. In addition, persons who take a higher percentage of photos (or regularly) take photos in cities remote from their home may be offered travel advertisements (e.g., airline ads, vacation package ads, hotel ads, rental car ads, etc.).

Figure 6:
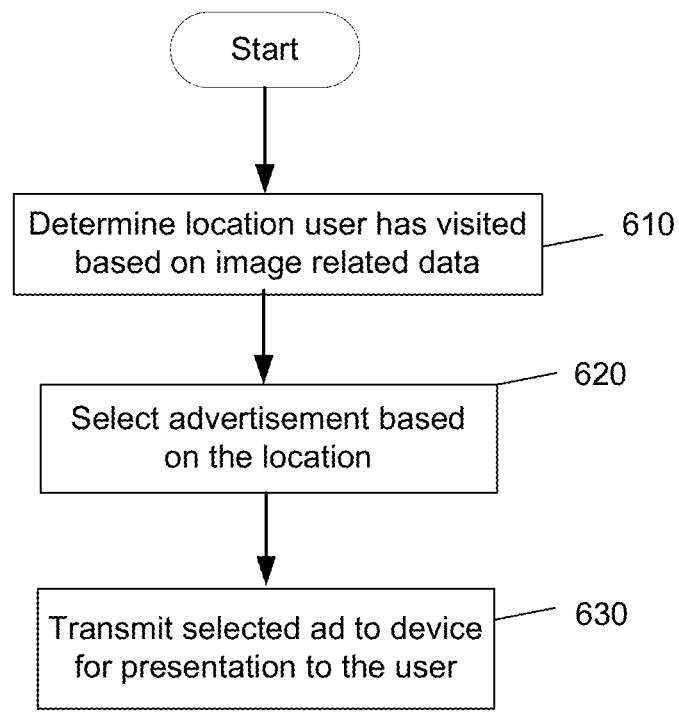
FIG. 6 is a flow chart for advertising according to an example embodiment of the present invention.

Referring to FIG. 6, in one example embodiment the process at 610 may include determining a location that a user has visited based on location information associated with one or more images The location information may comprise the location information supplied with an image from the camera device 60 that indicates where the image was captured and/or location information supplied by the user. In some embodiments, this process 610 may include determining that the user visited the location on a plurality of different dates (days), months, years, or other (potentially spaced apart) times to conclude that the user frequents the location repeatedly (e.g., not one day and not merely for one week while on vacation). Thus, in one example embodiment data from a plurality of images (captured on a plurality of different dates, months, years, or other time interval) may be processed to determine that the user has visited a given location a plurality of times on a plurality of different dates, months, years, or other time interval. Thus, the process may include determining that a plurality of images (e.g., some predetermined number) supplied by a user (or that include the user as determined by facial recognition or as identified by the user capturing the image) satisfy a predetermined minimum temporal disparity (e.g., are taken on different dates, months, years, or other time interval) have a common location associated with them (i.e., satisfy a similarity threshold with respect to location). The location may comprise a physical location (e.g., a city, a county, a country, a street address) a business (e.g., Fed Ex Field, Pizza Hut®, Valley Mall®, etc.) or other location. At 620 the process may include selecting one or more advertisements for services and/or products based on the location such as products and/or services available for purchase (or use) at the location. At 630, the process may further include transmitting the selected one or more advertisements to a computing device (e.g., the user's mobile telephone which supplied the images) for presentation to the user. In practice, a user that supplies a plurality of images taken at Starbucks® over a three months may be transmitted an advertisement (e.g. discount coupon) for Starbucks or a Starbucks competitor. A user identified in a plurality of images captured in Thailand may be transmitted advertisements for an airline that services Thailand and the user's home city (thereby basing the selection on multiple locations associated with the user). In some embodiments, the location (e.g., address or city) of the user's home may be excluded for use by itself since the user may have already provided information of his/her home. In other embodiments, the location of the user's home may be the location information sought for using in selecting and providing advertising (e.g., because the user did not otherwise supply information of his/her home address, city, and/or state and/or home services may be advertised (maids)).

Some user information may be discerned from postings (comments, captions, or other text supplied) by the user and stored on the server such as, for example, when supplied in association with a posted image. In some instances, location data also may be sent to the server without image data such as from a mobile phone that executes an application to periodically send the location data, that sends a text message or posts content (and wherein the transmission from the user's mobile telephone includes location information such as via geotagging) and/or that sends location data in response to an input from the user (that may also include textual content supplied by the user that relates to the user's current location) and/or query from the server (e.g., such as a query for location data and/or other information).

In return for allowing advertising to be selected based on image data, images to serve as advertisements (e.g., to be hyperlinked to a web page of one or more products for sale) and/or for allowing the server system 50 to use other user image related data, the user may receive compensation such as a discounted (and/or upgrades on features and/or services) on a mobile telephone service plan, internet access plan, cable television plan, or discounted photo development, etc. In addition, the user submitting a photo of another user (or another person is not a user) likewise may be compensated. Thus, a financial transaction may be initiated by a third party (and completed by the same third party or a different party) that benefits the user for permitting his/her images to processed, images to be used as an advertisement, to permit advertising selection to be performed based on his/her image related data, and/or permitting another use of the user image related data.

In order to search the images, a user may supply search criteria to an algorithm to search for all images taken at a particular event, location (Grandma's house), holiday (Thanksgiving), date (Dad's birthday), time frame (e.g., summer), that also includes one or more people (Dad), that also includes certain content items (e.g., a boat), etc. In one embodiment, the user defined alias for a location (or time or person) may be stored in the database as a separate field and in another embodiment, such user defined aliases may be stored in a separate table or database (e.g., that equates a particular latitude and longitude (or address) to Grandma's house, person's name to nickname, date to user alias for the date, etc.) and may be used by the query engine (when entered by the user), for example, to search a location field for an approximate latitude and longitude (or address). Thus, the search term "Grandma's House" supplied by the user may be converted to a longitude and latitude (or address) which is used to query the database. A user may enter a search term "My birthday" or "John and Jill's Anniversary" and each may be converted to a date for searching. Similarly, a user may enter "Dad" or "Sister" as part of the search criteria and these nicknames may be converted to user names to perform the searching. Based on the time of day, the user may also search for nighttime images at a location, based on image recognition search for images with snow, based on date information search for winter images, etc. The images may be processed when searched or processed when stored to determine whether the image is a nighttime or daytime image, contains snow, includes content items, etc. Once processed, the processing results may be stored in memory (in the image database 110) in association with each processed image so that future searches do not require repeated processing of images. Various search parameters may be permitted as the particular search criteria permitted may vary for various embodiments. However, as the facial database and the content item database mature and include more faces and items, additional processing may be performed on previously process images in order to attempt to identify more persons and items in the images.

In addition, in response to a user input (e.g., a click of a button or link by the user), the software may search for and/or visually group (or alphabetically sort) images according to location with each group sorted chronologically. In addition, in response to a user input, the software may visually group images chronologically (either by day of the year or date), which may then be grouped (or alphabetically sorted) according to location. For example, if sorted by day of the year all of the Christmas images may be grouped together (from multiple years) so that the user can easily access holiday, birthday and other days on which photos are repeatedly taken.

In response to a user input, the software also may cause the processing device to search for and/or visually group images according to type of event (sports event, football game), and additionally (or alternately) by event (Redskins vs Cowboys football game). For example, the program code may allow for sorting of types of events where football games comprises one type of event, which may then be sorted by Redskins vs Cowboys games, which then may be sorted chronologically—to allow the user to see all the photos from all of the Redskins vs Cowboys football games over a plurality of years.

After a plurality of images have been captured over days, months, or years, it may be desirable to the operator of the server system 50, the user(s) capturing the images, and/or others to arrange images in a desired arrangement such as, for example, by arranging (or grouping) the images (e.g., videos, photos) based on the location data of each image. For example, a world map (or country map, city map, state map, or county map) may be displayed with icons (e.g., pins) depicting locations where images have been taken (and how many taken at each location). "Pins" of different colors may indicate different time frames (e.g., years or months) during which images were taken. Thus, all the images of particular year may be indicated by one or more pins of a first color and images taken in another year may be indicated by one or more pins of a second color. Other indicia (e.g., shapes, sizes, etc.) other than colors also may be used. By clicking on an icon, one or more (or all) of the images at that location may be visible (or accessible) and displayed (e.g., in a list or as thumbnails) in chronological order of the taking of the images. Users may be able to zoom in to any area (such as their home city) so that one pin (when the whole world is viewed) transitions to a plurality of pins corresponding to the plurality of locations in the area (e.g., city) where the images were taken.

In addition, images may be stored and displayed in a "stack" format based on the location at which the image was taken. Thus, when the user opens up a folder with multiple images, images taken at the same location may be stacked (displayed so that only one image (e.g., most recent) is visible with a number indicating how many images are in the stack (taken at that location). At the user's request, stacking also may occur based on time so that when the user opens up a folder with multiple images, images taken within a predetermined time period of each other (e.g., the same day or within two hours, etc.) may be stacked (displayed so that only one image (e.g., most recent) is visible with a number indicating how many images are in the stack (taken during that time window).

As discussed, a plurality of image data may be collected, and based on that data, a plethora of data may be determined about one or more users. For example, if two people are determined to be in multiple images together, they may very likely be friends. Consequently, in response to the server determining that two people are in a predetermined number of images together, the server may determine if the two people are friends (or otherwise have a connection established on the social network). If not, the server may send a notification to one or both of the persons suggesting the other person as a friend. The notification may include a link (or option) to send a request to the other person to become a friend or otherwise establish a connection. The person receiving the request to become a friend may then confirm or decline the friendship (or other connection). If the request is confirmed, the friendship or other connection is thereby established as a result of the image processing.

The server system 50 may process the image data to detect images supplied by different users that were taken at the same locations (e.g., addresses, businesses, schools, landmarks, etc.), at the same location and time, with the same person(s) in the image, with the same items in images (e.g., skis), at the same events or type of events and, if found, may provide notifications to both (or all) users with the common data if other criteria is met. In one embodiment, the server system 50 may determine that both John and Joe have taken photos that include Cheryl and a friendship suggestion notification may be transmitted to John and Joe as discussed above. In another embodiment, if Steve and Carol are already friends, they can each be notified of the fact they are both skiers—which may allow them to ski together or join the same online ski group. Groups of people who reside in a given area (e.g., city or neighborhood) may be notified that they are all Redskins fans (or have some other common interest) thereby allowing those users who so desire to open a dialogue (contact others) about the Redskins such as to watch Redskins games together. Thus, the software may determine a commonality of image related data from (multiple) images supplied by (or including) persons (who may live in given predetermined area) and output a notification to those persons informing them of the commonality (e.g., the following people in your neighborhood ski or like the Cowboys or run in the park, etc.). The notification may facilitate the ability of each recipient of the notification to communicate with all or some of the other recipients of the notification (e.g., by including a link and/or text box to send an (anonymous) email thereto). The notification may include an invite for each recipient to join a group of other persons—of which many (or all) who may have the same commonality. Thus as new image related data is supplied and determined and new commonality identified for multiple users, those users may be invited to join pre-existing and/or new groups. Thus, based on image related data the server system 50 may create a new group (e.g., users who take their dog to a given dog park) and invite those users who have been determined by the server system 50 to have that commonality to join the new group.

A camera device (e.g., mobile telephone that includes a camera) may be hung around the user's neck in manner as a pendant, or in the person's eyeglasses, as a watch, attached to clothing like a broach or pin on the person's shirt or jacket. The camera of the camera device may be activated automatically to take a photo (still photo, video including audio) and/or record audio upon detection of a trigger event which may comprise any one or more of the following events:

detection of a sound above a threshold levels of decibels, detection of certain words (in which case audio is continuously recorded at least temporarily and processed to identify the words), at a certain time, upon arrival of the camera device (and user) at a certain location or event (e.g., which may be stored in memory of the camera device), at a certain time and at a certain location, arriving within a distance of a person (whose presence may be detected by the camera device via a Bluetooth communication with a device carried by the person or by facial recognition by the camera (which may continually capture photos (or video) and process images—but does not, for example, store more than six images or more than sixty seconds of video unless the trigger event is detected) or remote server, and/or upon detection of another trigger event.

Data of the trigger event(s) to be detected may be stored in the camera device 60 (which may then determine whether a trigger event has occurred and initiate capture, storage (if desired) and transmission of image data) and/or the server 50. If stored at the server, the camera device may at times transmit sufficient data to the server system 50 to permit the server system 50 to determine whether the trigger event has been satisfied and when a trigger event is satisfied the server system 50 may transmit a command to the camera device to begin capturing, storing (if necessary), and transmission of image data (still images and/or video images with audio) to the server system 50 and/or another destination.

If a trigger event is detected (e.g., a certain person or event is detected), the camera device (e.g., mobile telephone) may transmit a notification to a remote device that includes an image, video, audio as well other image data such as date, time, corresponding day (if any), people, location information (e.g., longitude and latitude and/or address and/or location name (which may be a business name and/or a user defined name for the location), event, etc.

In one embodiment, facial data determined by the user's mobile telephone along with identity of person supplied by user is transmitted to the server system for storage and used in the facial database to identify person's in images from other users.

In one example embodiment, the method, implemented by a mobile telephone, tablet, portable computer, server, or other computing device, may include determining location data and temporal data of a first image; determining whether an alias exists for the location data of the first image captured by a camera device of a first user; wherein said determining whether a location alias exists for the location data, comprises accessing a navigation application to determine whether an alias exists for the location data; if a location alias exists for the location data, storing the location alias in memory in association with the first image and further storing the location alias in memory in association with one or more other images having associated location data that satisfies a similarity threshold with the location data of the first image; determining whether an alias exists for the temporal data of the first image; wherein said determining whether a temporal alias exists for the temporal data, comprises accessing a calendar application to determine whether an alias exists for the temporal data; if a temporal alias exists for the temporal data, storing the temporal alias in memory in association with the first image and further storing the temporal alias in memory in association with one or more other images having associated temporal data that satisfies a similarity threshold with the temporal data of the first image; determining meta data for location and time of first image; determining an identity of a person captured in the first image via facial recognition processing of facial data of the person; storing information of the identity of the person in the first image in memory in association with the first image; transmitting a notification to the person identified in the first image; determining a person alias for the person identified in the first image; storing the person alias in memory in association with the first image; storing the person alias and identity of the person in memory in association with one or more other images having facial data of a person that satisfies a similarity threshold with the facial data of the identified person in the first image; determining a content item in the image via image processing; wherein said image processing is based on one or more of a shape of the content item, a size of the content item; a color of the content item; and optical character recognition; performing character recognition of text in the image; determining whether the text is of a size to be significant and, if so, taking an action based on said text comprising storing and outputting said text and selecting an advertisement; receiving an oral (or typed) annotation associated with the image from the first user; determining whether said oral (or typed) annotation includes an alias for a person, location or time; storing the alias determined from said oral (or typed) annotation in memory in association with said image; storing, permitting access to, or transmitting the first image differently based on the temporal data (e.g., time, day of week), identity of person identified in the first image, and/or identity of a content item recognized in the first image; transmitting the first image to a second user in response to a request; hyperlinking the recognized content image (or the entire image) to a web page (1) providing information about the content item; or (2) to facilitate purchasing an article of commerce (which may comprise the content item); selecting an advertisement for the first user who captured the image based on image related data of the image; selecting an advertisement for the second user who viewed the image based on image related data of the image; selecting an advertisement for the person identified in the image based on image related data of the image; determining that a parameter of image data (e.g., a common location, event, team, vacation spot, date, etc.) of multiple images supplied by different users satisfies a similarity threshold and notifying the multiple users.

In another embodiment, the method may comprise receiving image data and image meta data for a plurality of images associated with a user; storing the image data and image meta data in a memory; determining image related data based on the image data and/or image meta data; storing the image related data in memory; determining whether to take an action based image related data and filtering information supplied by the user; if it is determined to take an action based image related data and filtering information, taking the action; selecting one or more advertisement based on image related data of one or more images; providing the one or more selected advertisements to the user and/or other users; in response to providing the selected one or more advertisements to the user, initiating a financial benefit to the user; determine one or more notifications to communicate to the user based on the image related data; and communicating the one or more notifications to the user.

In yet another embodiment the method may comprise receiving, from a user device, an image and location data associated with the image and temporal data associated with the image; based on the temporal data, determining that the image was captured within a predetermined time period; selecting an advertisement based on the location data; and transmitting the selected advertisement to the user device; wherein said selecting is further based on a bid to be paid by the advertiser of the selected advertisement. The method wherein a selection parameter of the advertisement is that an advertiser associated with the selected advertisement be visible from the location of the user device. The method comprising receiving a response to the transmitted advertisement from the user device; and initiating a benefit to the user. In one embodiment, the advertisement includes a coupon for display to an advertiser associated with the advertisement and wherein the coupon comprises a QR code.

In still another embodiment, the method (referring to FIG. 7), implemented by one or more computers, for processing a first image captured by a camera device, wherein the first image has location data and temporal data associated therewith at least some of which originates from the camera device, may comprise determining whether a location alias exists for the location data of the first image at 710; if a location alias exists for the location data, storing the location alias in memory in association with the first image at 720; determining whether a temporal alias exists for the temporal data of the first image at 750; if a temporal alias exists for the temporal data, storing the temporal alias in memory in association with the first image at 760; outputting the first image to a display in response to a request at 770, if a temporal alias exists, outputting the temporal alias to the display for viewing concurrently with the first image at 770; and if a location alias exists, outputting the location alias to the display for viewing concurrently with the first image 770. The location alias for the first image may comprise the name of a person and the word "home" or house". The temporal alias may comprise a name of a U.S. federal holiday and a year. The method may further comprise receiving a user input comprising a request from the first user that includes a first location alias; searching a database for images associated with the first location alias; and outputting to the display a plurality of images associated with the first location alias.

If the location alias exists for the location data of the first image, the method may further comprise storing the location alias in memory in association with one or more other images having associated location data that satisfies a similarity threshold with the location data of the first image. If the temporal alias exists for the temporal data of the first image, the method may further comprise storing the temporal alias in memory in association with one or more other images having associated temporal data that satisfies a similarity threshold with the temporal data of the first image.

Determining whether a location alias exists for the location data may comprise accessing a navigation application to retrieve a user-defined name associated with the location data. Determining whether a temporal alias exists for the temporal data may comprise accessing a calendar application to retrieve a user-defined name for the temporal data.

The temporal alias may comprise at least one phrase from the group of phases: party, birthday, and anniversary. The method may further comprise determining an identity of a person who appears in the first image via facial recognition processing of facial data of the person at 740; storing information of the identity of the person appearing in the first image in memory in association with the first image at 740; and transmitting a notification to the person identified in the first image. The method may further comprise determining a person alias for the person identified in the first image; storing the person alias in memory in association with the first image; and storing the person alias and identity of the person in memory in association with one or more other images having associated facial data that satisfies a similarity threshold with the facial data of the person identified in the first image.

The method may further comprise receiving an oral annotation associated with the first image from a first user; determining whether the oral annotation includes a person alias; and storing the person alias determined from the oral annotation in memory in association with the first image.

The method may further comprise identifying an object in the first image via image processing; wherein said identifying is based, at least in part, on a shape of the object; and storing the identity of the object in memory in association with the first image.

In yet another embodiment and referring to FIG. 7, the method, implemented by one or more computers, for processing a first image captured by a camera device, wherein the first image has location data associated therewith at least some of which originates from the camera device, may comprise determining that a location alias exists for the location data of the first image at 710; storing the location alias in memory in association with the first image at 720; determining an identity of a person who appears in the first image via processing of facial data of the person from the first image at 730; storing information of the identity of the person appearing in the first image in memory in association with the first image at 740; outputting the first image to a display in response to a request at 770; outputting the location alias to the display for viewing concurrently with the first image at 770; and outputting the identity of the person who appears in the first image to the display for viewing concurrently with the first image at 770. The method may to claim 10, may further comprise determining a person alias for the person identified in the first image, and storing the person alias in memory in association with the first image, and storing the location alias in memory in association with one or more other images previously stored in memory and that have associated location data that satisfies a similarity threshold with the location data of the first image. The method may further comprise receiving an oral annotation associated with the first image from a first user; determining whether the oral annotation includes a location alias; and storing the location alias determined from the oral annotation in memory in association with the first image.

In yet still another embodiment, the method, implemented by one or more computers, for processing a first image captured by a camera device, wherein the first image has temporal data associated therewith, may comprise determining that a temporal alias exists for the temporal data of the first image; storing the temporal alias in memory in association with the first image; determining an identity of a person who appears in the first image via processing of facial data of the person from the first image; storing information of the identity of the person appearing in the first image in memory in association with the first image; determining a user-defined person alias for the person identified in the first image; storing the user-defined person alias in memory in association with the first image; receiving an annotation associated with the first image from a first user; determining that the annotation includes a temporal alias; storing the temporal alias determined from the oral annotation in memory in association with the first image; outputting the first image to a display in response to a request; outputting the temporal alias to the display for viewing concurrently with the first image; outputting the user-defined person alias to the display for viewing concurrently with the first image; and outputting the temporal alias to the display for viewing concurrently with the first image.

While the embodiments described in the preceding paragraphs are described as methods, these embodiments and others described herein may be implemented as computer program products comprising a non-transitory computer usable medium having a computer readable program code embodied therein that executes to cause the computing device(s) (e.g., server, camera device, etc.) to perform the described functions and processes. Other embodiments may comprise a system that includes the camera device 60 (e.g., mobile telephone, tablet, portable computer, etc.) and server system 50 (e.g., remote computer system) that performs the functions and processes described herein.

The servers described herein may include one or more computer systems that each include a processor, memory, user input and user output mechanisms, a network interface, and executable program code (software) stored in memory that executes to control the operation of the server and/or camera device. Various commercially available computer systems and operating systems software may be used to implement the hardware and software. The components of each server may be co-located or distributed. In addition, all or portions of the same software and/or hardware may be used to implement two or more of the functional servers shown. Thus, in some embodiments the components of the figures may be considered functional components that employ the same hardware and some of the same program code. Other embodiments may include different functional components. In addition, the present invention is not limited to a particular environment or server configuration. In some embodiments and instances, functionality of the server system 50 described herein may be performed by a personal computer (e.g., the user's tablet computer, desktop computer, portable computer, etc.), a mobile telephone, and/or other device and vice versa. The server system may include additional or fewer components than those present in FIG. 1. For example, in some embodiments, the server system 50 need not include a web server or involve a social network. As will be evident to one skilled in the art, the functions described herein may be performed by executable program code stored in non-transitory memory that executes to cause the computing device (e.g., server, camera device, etc.) to perform the described functions and processes.

The image meta data (and/or other image related data) may be stored and/or associated with an image in any suitable manner such as via digital watermark (visible or invisible). The location data associated with an image may comprise non-coordinate based or coordinate based geographical information and may be attached to the image, embedded in the image, transmitted with the image, supplied before or after the image and may be stored in Exchangeable image file format (EXIF) format, Extensible Metadata platform (XMP) format, or another format.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A method, implemented by one or more computers, for processing a first image captured by a camera device, wherein the first image has temporal data associated therewith, comprising:
   without input from a user, determining that a user defined temporal alias exists for the temporal data of the first image;
   storing the user defined temporal alias in memory in association with the first image;
   determining a name of a person who appears in the first image via processing of facial data of the person from the first image;
   storing information of the name of the person appearing in the first image in memory in association with the first image;
   without input from a user, determining a user defined person alias for the name of the person in the first image;
   storing the user defined person alias in memory in association with the first image;
   outputting the first image to a display in response to a request along with:
   the user defined temporal alias; and
   the user defined person alias.

2. The method according to claim 1, further comprising:
   receiving a user input comprising a request from a first user that includes a first user defined temporal alias;
   searching a database for images associated with the first user defined temporal alias; and
   outputting for display one or more images associated with the first user defined temporal alias.

3. The method according to claim 1, wherein the user defined temporal alias comprises at least one phrase from the group of phases: party, birthday, and anniversary.

4. The method according to claim 1, the method further comprising storing the user defined person alias in a database in association with one or more other images having facial data that satisfies a similarity threshold with the person identified in the first image.

5. The method according to claim 1, wherein said determining that a user defined temporal alias exists for the temporal data of the first image comprises accessing a calendar application to retrieve a user defined name for the temporal data.

6. The method according to claim 1, further comprising:
   identifying an object in the first image via image processing;
   wherein said identifying is based, at least in part, on a shape of the object; and
   storing the identity of the object in memory in association with the first image.

7. The method according to claim 1, further comprising transmitting a notification to the person who appears in the first image.

8. The method according to claim 1, the method further comprising storing the user defined temporal alias in a database in association with one or more other images having associated temporal data that satisfies a similarity threshold with the temporal data of the first image.

9. The method according to claim 8, the method further comprising storing the user defined person alias in a database in association with one or more other images having facial data that satisfies a similarity threshold with the person identified in the first image.

10. The method according to claim 1, wherein the first image has location data associated therewith, the method further comprising:
    without input from a user, determining that a user defined location alias exists for the location data of the first image; and
    storing the user defined location alias in memory in association with the first image.

11. The method according to claim 10, further comprising:
    receiving a user input comprising a request from a first user that includes a first user defined location alias;
    searching a database for images associated with the first user defined location alias; and
    outputting to the display one or more images associated with the first user defined location alias.

12. The method according to claim 10, the method further comprising storing the user defined person alias in a database in association with one or more other images having facial data that satisfies a similarity threshold with the person identified in the first image.

13. The method according to claim 10, wherein said determining that a user defined temporal alias exists for the temporal data of the first image comprises accessing a calendar application to retrieve a user defined name for the temporal data.

14. The method according to claim 10, further comprising:
    identifying an object in the first image via image processing;
    wherein said identifying is based, at least in part, on a shape of the object; and
    storing the identity of the object in memory in association with the first image.

15. The method according to claim 10, wherein said determining that a user defined location alias exists for the location data comprises accessing a navigation system to retrieve a user defined name associated with the location data.

16. The method according to claim 15, wherein said determining that a user defined temporal alias exists for the temporal data of the first image comprises accessing a calendar application to retrieve a user defined name for the temporal data.

17. The method according to claim 10, further comprising storing the user defined location alias in a database in association with one or more other images having associated location data that satisfies a similarity threshold with the location data of the first image.

18. The method according to claim 17, the method further comprising storing the user defined temporal alias in a database in association with one or more other images having associated temporal data that satisfies a similarity threshold with the temporal data of the first image.

19. The method according to claim 17, further comprising:
    identifying an object in the first image via image processing;
    wherein said identifying is based, at least in part, on a shape of the object; and
    storing the identity of the object in memory in association with the first image.

* * * * *